US007328404B2

(12) United States Patent
Critchlow

(10) Patent No.: US 7,328,404 B2
(45) Date of Patent: Feb. 5, 2008

(54) METHOD FOR PREDICTING THE READINGS OF JAPANESE IDEOGRAPHS

(75) Inventor: Richard Lee Critchlow, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 871 days.

(21) Appl. No.: 09/859,341

(22) Filed: May 17, 2001

(65) Prior Publication Data

US 2002/0152246 A1 Oct. 17, 2002

Related U.S. Application Data

(60) Provisional application No. 60/219,981, filed on Jul. 21, 2000.

(51) Int. Cl.
*G06F 15/00* (2006.01)
(52) U.S. Cl. .......................... 715/535; 715/531; 704/1
(58) Field of Classification Search ................. 381/43; 382/13; 704/9, 256, 10, 256.5; 395/752; 364/419; 341/22; 715/535
See application file for complete search history.

(56) References Cited

U.S. PATENT DOCUMENTS

| | | | | | |
|---|---|---|---|---|---|
| 4,718,102 A | * | 1/1988 | Crane et al. | ................ | 382/185 |
| 4,837,689 A | * | 6/1989 | Tanaka et al. | ................. | 704/8 |
| 5,033,087 A | * | 7/1991 | Bahl et al. | .................. | 704/256 |
| 5,099,425 A | * | 3/1992 | Yuji et al. | ....................... | 704/9 |
| 5,586,198 A | * | 12/1996 | Lakritz | ....................... | 382/185 |
| 5,794,177 A | * | 8/1998 | Carus et al. | ................... | 704/9 |
| 5,805,832 A | * | 9/1998 | Brown et al. | .................. | 711/1 |
| 5,867,812 A | * | 2/1999 | Sassano | ....................... | 704/10 |
| 6,035,269 A | * | 3/2000 | Kim | .............. | 704/9 |
| 6,621,424 B1 | * | 9/2003 | Brand | ......................... | 341/22 |

OTHER PUBLICATIONS

M. Nagao, An Attempt to computerize dictionary data bases, 1980, Association for Computational Linguistics, pp. 534-542.*

* cited by examiner

*Primary Examiner*—Doug Hutton
*Assistant Examiner*—Quoc A. Tran
(74) *Attorney, Agent, or Firm*—Woodcock Washburn LLP

(57) ABSTRACT

System and methods allowing for effective and reliable reading predictions for Japanese ideographs are provided. In an illustrative implementation, a reading predictions system operating in "learning" and "execution/run-time" modes is provided. In the "learning" mode the reading predictions system operates on a number of input sources to produce a decision tree that is used in the "execution/run-time" mode to return reading predictions for inputted Japanese sentences containing Japanese ideographs. Among the inputs utilized in the "learning" mode are base Japanese script readings, a training corpus, and quasi-phonological rules. From these inputs underlying readings and a decision tree are created. When operating in the "execution/run-time" mode, the reading predictions system employs a morphological analyzer to perform a morphology analysis on inputted sentences. Using the morphological analysis, the quasi-phonological rules, the underlying readings, and the decision tree reading predictions are provided.

18 Claims, 7 Drawing Sheets

METHOD FOR PREDICTING THE READINGS OF JAPANESE IDEOGRAPHS

PRIORITY

This application is related to and claims priority under 35 U.S.C. § 119(e) to U.S. Provisional Patent Application Ser. No. 60/219,981, filed Jul. 21, 2000, entitled "METHOD FOR PREDICTING THE READINGS OF JAPANESE IDEOGRAPHS," the contents of which are hereby incorporated by reference in their entirety.

BACKGROUND OF THE INVENTION

1. Field of the Invention

The present invention relates to the field of predicting readings of foreign languages, and more particularly, to the reliable and effective reading predictions of Japanese ideographs.

2. Brief Description of Prior Developments

The Japanese language is written using a combination of four scripts: hiragana, katakana, romaji, and kanji. Hiragana and katakana are syllabaries—phonetic scripts in which each character represents a syllable of a word. Generally, hiragana and katakana are collectively referred to as kana. Katakana are usually reserved for writing words that have been borrowed from foreign languages (except Chinese) within the last 400 years; they also may be used to provide emphasis or for graphic effect. Romaji are an alphabet—the familiar Roman alphabet used in North America, Western Europe and elsewhere. In the past, romaji have been used to transcribe loan words, for emphasis, and to transcribe Japanese for foreign armies of occupation. Kanji are ideographs—characters that represent specific words or parts of words, rather than specific sounds. It is not the case that kanji are only related to free floating ideas, however. The link between kanji and words is fixed, for the most part. That is, for most words, a writer cannot choose between different kanji. For example, even though all Japanese speakers would agree that both the characters 犬and 狗essentially mean "dog", it would be incomprehensible to write the word 忠犬(chuuken) "faithful dog" using the character 狗. Likewise, the link between words and their pronunciation is fixed. That is, dialectal variation aside, there is usually only one way to pronounce a word. Thus, there is a firm link between kanji and pronunciation, but it is not a direct one—it is always mediated through the particular word that is being written.

Writers can however choose whether or not to use kanji at all. It would not be incorrect to write chuuken using hiragana (ちゅうけん), hiragana (チュウケン), romaji (chuuken), or a mixture (忠けん, ちゅう犬). It is very common to write words (especially verbs) in a combination of kanji and hiragana. However, any other mixture of scripts within the same word is unusual enough to be considered an error. Because a word that contains kanji can also be written in a phonetic script, it is possible to talk about the phonetic value of the kanji in that word. This is what is meant by the reading of a kanji in a particular word—its pronunciation when the word is read aloud, or its spelling in a phonetic script when the word is written phonetically. For example, the reading of 犬in 忠犬is ken. However, because of the particular history of Japanese, most kanji have at least two entirely distinct readings. For example, the reading of 犬in the word 犬泳ぎ(inuoyogi) is inu; 人is read as nin in 人間(ningen), jin in 日本人(nihonjin), and hito in 人々(hitobito). Furthermore, many kanji have different readings that are systematically related to each other. For example, 発is read as hatsu in 開発(kaihatsu), ha? in 発表(happyou), and patsu in 活発(kappatsu).

A final source of complexity when determining the underlying reading of Japanese written language (e.g. Japanese script) is that there is some variation in how much of a word is represented in kanji. For example, the word kakitsuke is sometimes written as 書き付け, but at other times as 書付け. The reading of the kanji 書is ka in the first variant, kaki in the second. Both of these variants are considered acceptable, but to mix the two variants in a single document is considered an error.

Given all of the above-mentioned sources of variation, predicting the correct reading of a kanji in a given word is not a simple task. Educated native speakers of Japanese can usually remember or guess the correct readings of kanji, but software is less successful at performing this task.

Currently practices in automating the reading of Japanese script are inefficient and can be unreliable. For example a brute force solution to the problem is to create a dictionary of words and link the entry for the phonetic spelling of a word to the entries for all its other dictionary spellings. This type of solution, however, faces several problems. Since Japanese is traditionally written without inserting space between words, it is far from trivial to look words up in a dictionary. It would be necessary to first identify the boundaries between the words, requiring a considerable level of linguistic knowledge and an expenditure of significant resources. Because Japanese is a more highly inflected language than English, it is quite common for word forms to be extensively modified by affixation and compounding; a dictionary that contained every possible form of a word would be astonishingly large and unwieldy. As such, no dictionary could be sufficiently large to adequately predict readings of Japanese script. Further, since new words are always being coined or borrowed such a dictionary would always have to be adaptable and updateable.

From the foregoing it is appreciated that there exists a need for systems and methods that efficiently and reliably predict the reading of Japanese script. By having these systems and methods, the drawbacks of existing practices are overcome.

SUMMARY OF THE INVENTION

A system and methods to efficiently predict readings of Japanese script is provided. In an illustrative implementation, the present invention comprises a reading predictions system operating in two modes, "learning" and "execution/run-time" modes. In the "learning" mode a reading analyzer accepts as input base Japanese script (i.e. kanji) readings, a training corpus (e.g. a lexicon of Japanese words and their readings) and quasi-phonological rules to produce an analyzed corpus and underlying readings for each entry in the training corpus. A corpus classifier is then invoked to produce a decision tree. In the described implementation, the corpus classifier employs a learning algorithm to create the decision tree.

When operating in the "execution/run-time" mode, a reading predictor accepts as input the created decision tree, the generated underlying readings and the quasi-phonological rules. In addition, the reading predictor accepts as input a morphological analysis of inputted Japanese sentences having Japanese ideographs. The morphological analysis is created by a morphological analyzer which, among other things, operates to parse inputted Japanese sentences. Using these inputs, the reading predictor produces reading predictions for the inputted Japanese sentences.

In the implementation described, the reading predictions system is incorporated in an exemplary computing application providing style checking for inputted Japanese text.

DETAILED DESCRIPTION OF THE DRAWINGS

The methods and system predicting the readings of Japanese ideographs is further described with reference to the accompanying drawings in which.

DETAILED DESCRIPTION OF ILLUSTRATIVE IMPLEMENTATIONS

Overview

Figure 1:
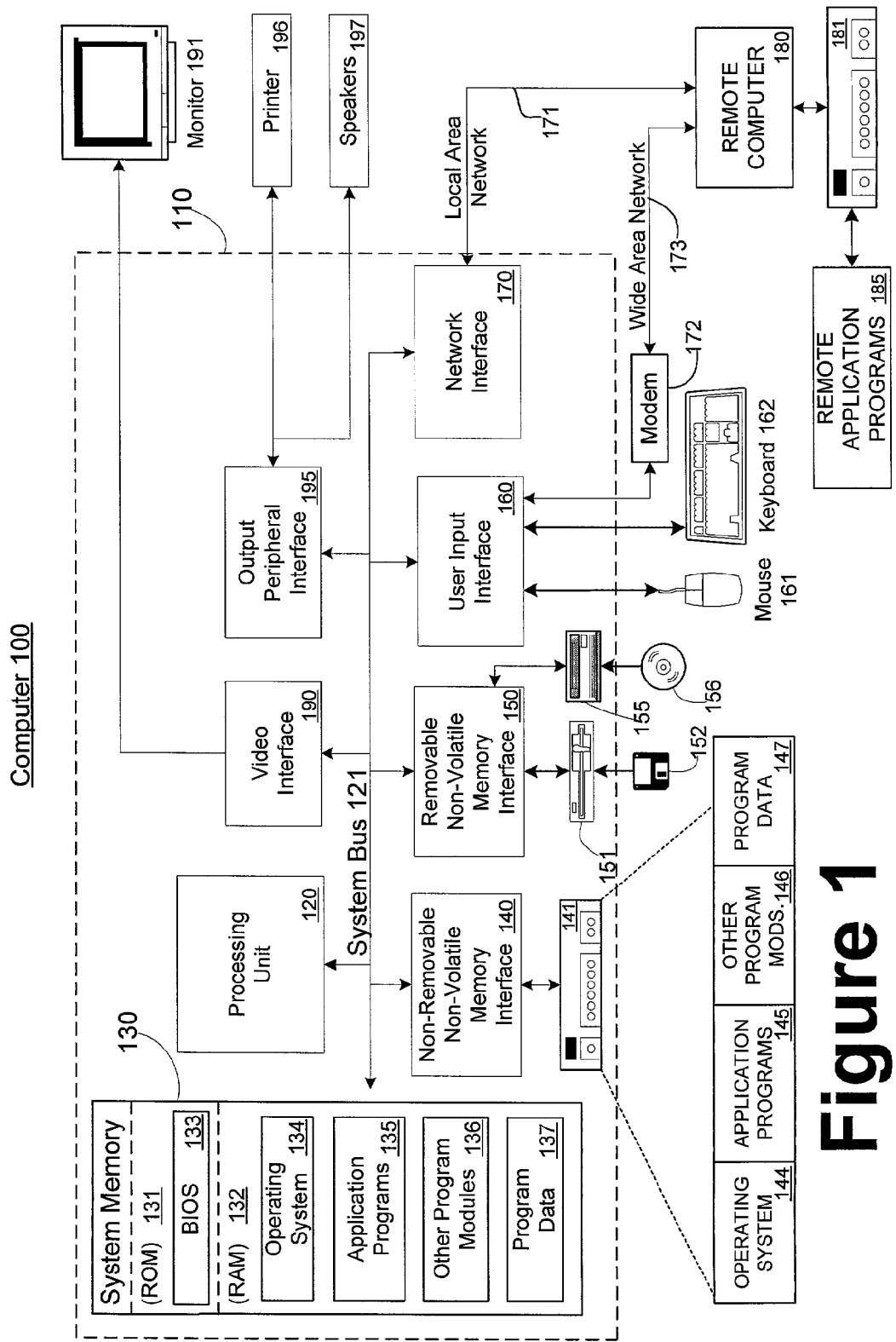
FIG. 1 is a block diagram of an exemplary computing environment in which aspects of the present invention may be incorporated.

The Japanese language is spoken by the approximately 120 million inhabitants of Japan, and by the Japanese living in Hawaii and on the North and South American mainlands. It is also spoken as a second language by the Chinese and the Korean people who lived under Japanese occupation earlier this century.

Generally, three categories of words exist in Japanese. The native Japanese words constitute the largest category, followed by words originally borrowed from China in earlier history, and the smallest but a rapidly growing category of words borrowed in modern times from Western languages such as English. This third category also contains a small number of words that have come from other Asian languages. The frequency of these three types of words varies according to the kinds of written material examined. For example, in magazines, native Japanese words constitute more than half of the total words, while the Chinese borrowed words average about 40%, and the rest drawn from the recently borrowed words from Western languages. In newspapers, the words of Chinese origin number greater than the Japanese native words.

Japanese has an open-syllable sound pattern, so that most syllables end in a vowel—the syllable may be composed solely of the vowel. There are five vowels, /a/, /i/, /u/, /e/, and /o/. Vowel length often distinguishes words, as in to for "door" and too for "ten." The basic consonants are: /k/, /s/, /t/, /n/, /h/, /m/, /y/, /r/, /w/, and the syllabic nasal /N/. Many of these consonants can be palatalized in front of the vowels /a/, /u/, and /o/, for example, /kya/, /kyu/, /kyo/. When the two consonants, /s/ and /t/, occur with the vowel /i/, these consonants are automatically palatalized as /shi/ and /chi/. The consonant /t/ is pronounced as /ts/ in front of the vowel /u/. Unlike English, which has stress accent, Japanese has pitch accent, which means that after an accented syllable, the pitch falls. The word for "chopsticks," hashi, has the accent on the first syllable, so its pitch contour is ha shi. Without the accent on the first syllable, hashi may mean "bridge" or "edge." "Bridge" has accent on the second syllable, which can be seen if a grammatical particle such as the subject marker ga is attached to the word: hashi ga. "Edge" has no accent, so it would be pronounced without any fall in the pitch even with a grammatical marker such as ga.

Every language has a basic word order for the words in a sentence. In English, the sentence "Naomi uses a computer" has the order subject (Naomi), verb (uses), and object (a computer). In the corresponding Japanese sentence, the subject comes first, just as in English, but then the object appears, followed finally by the verb: Naomi-ga (Naomi) konpyuuta-o (computer) tukau (use). The rule of thumb in Japanese is that in a sentence, the verb comes at the end. The two word orders, subject-verb-object for English and subject-object-verb for Japanese, are both common among the languages of the world. If we look again at the Japanese sentence, we see that the subject and the object are accompanied by particles, ga with the subject "Naomi" (Naomi-ga) and o with the object "computer" (konpyuuta-o). These are called case markers, and a large number of the world's languages have them. We can see a remnant of a case-marking system even in English: the pronouns in English change shape depending on where it occurs, he/she/they in the subject position, but him/her/them in the object position (e.g., She saw him). Similarly, the older English of five hundred to one thousand years ago had an extensive case-marking system similar to modern Japanese. These case markers make it possible for the words in Japanese to appear in different orders and retain the same meaning. In the exemplary sentence, it is possible to place the object where the subject normally occurs, and the subject in the normal object position, and not change the meaning: konpyuuta-o Naomi-ga tukau. In English if the same transposition were made, the meaning of the sentence would be radically altered (e.g. The computer uses Naomi). Other variants in the Japanese language make the task of transcribing from English to Japanese or vice-versa arduous at best.

Japanese is primarily written using two systems of orthography, Chinese characters and syllabaries. Chinese characters, or kanji, were brought in from China starting about 1,500 years ago. Prior to their introduction, Japanese was strictly a spoken language. Chinese characters are by far the more difficult system because of the sheer number of characters and the complexity both in writing and reading each character. Each character is associated with a meaning; for example, the character 犬 has the basic meaning "dog." There are tens of thousands of characters attested, but in 1946, the Japanese government identified 1,850 characters for daily use. In 1981, the list was increased in number to 1,945 characters, and given the name Joyo Kanji List (Kanji for Daily Use). The characters in the Daily Use List must be learned in primary and secondary schools, and newspapers generally limit the use of characters to this list. Most characters are associated with at least two readings, the native Japanese reading, and the reading that simulates the original Chinese pronunciation of the same character. If the same character came into Japan at different periods or from different dialect regions of China, the character may be associated with several Chinese readings that represent different historical periods and dialectal differences. The second system of writing is syllabaries, or kana, which were developed by the Japanese from certain Chinese characters about 1,000 years ago. Each character in the syllabary represents a syllable in the language, and, unlike Chinese characters, it represents a sound but not meaning. There are two types of syllabaries, hiragana and katakana, each containing the same set of sounds. Hiragana is often used in combination with a Chinese character, in such a way that, for example, the character represents roughly the root of a verb, and the inflection is written with hiragana. Katakana is used to write loan words from Western languages such as English, French, and German. It is not uncommon to find kanji, hiragana, and katakana used in the same sentence. Along with Chinese characters and syllabaries, the Roman alphabet is sometimes employed for such things as names of organizations. Given this complex situation, it is not difficult to imagine that the reliable reading of Japanese scripts can be arduous at best.

The present invention addresses the challenge of reading prediction by identifying a minimal set of underlying readings for each kanji, defining a set of quasi-phonological rules which operate on the underlying readings in order to produce a surface reading, and constructing a decision tree data structure that is used to determine which underlying reading should be chosen for each kanji in a word. The underlying readings consist of a literal reading and a set of data that controls the operation of the quasi-phonological rules. The decision tree allows the algorithm to choose the most likely reading for a kanji, based only on information obtained during the morphological analysis of the word in which it is found.

The set of underlying readings and the decision tree are learned automatically from a set of linguistic resources including lexical, morphological, and phonological information. The construction of the optimal set of readings and tree enables reading prediction to be made efficiently.

As will be described below with respect to FIGS. 1-5, the present invention is directed to a system and methods for effectively and reliably predicting readings for Japanese scripts. In accordance with an illustrative implementation thereof, the present invention comprises a system and method to provide content providers with data in a preferred data type.

In one embodiment, described more fully hereinafter, the methods and apparatus of the present invention may be implemented as part of a computing environment executing one or more components directed to the reading and analysis of Japanese script. The computing environment may comprise various hardware and software combinations to realize the reading of Japanese scripts.

Exemplary Computing Environment

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Predicting Readings of Ideographs

Figure 2:
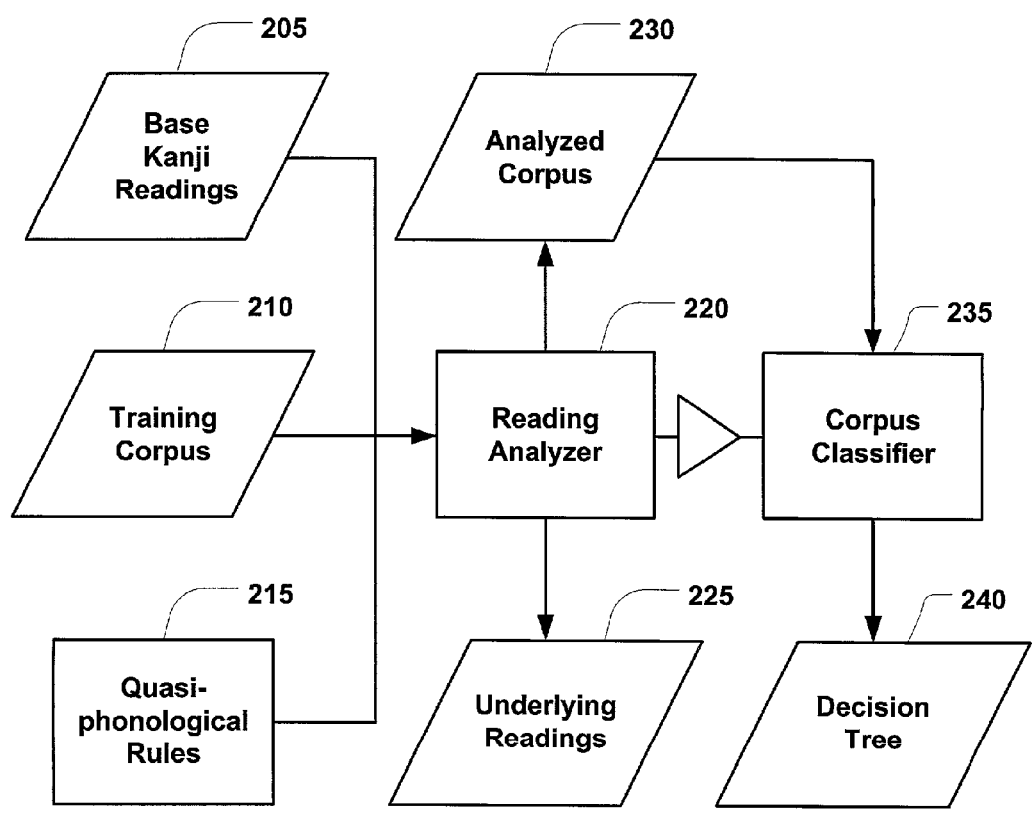
FIG. 2 is a block diagram of components cooperating to execute the learning feature related to the effective prediction of readings of Japanese script in accordance with the present invention.
Figure 2A:
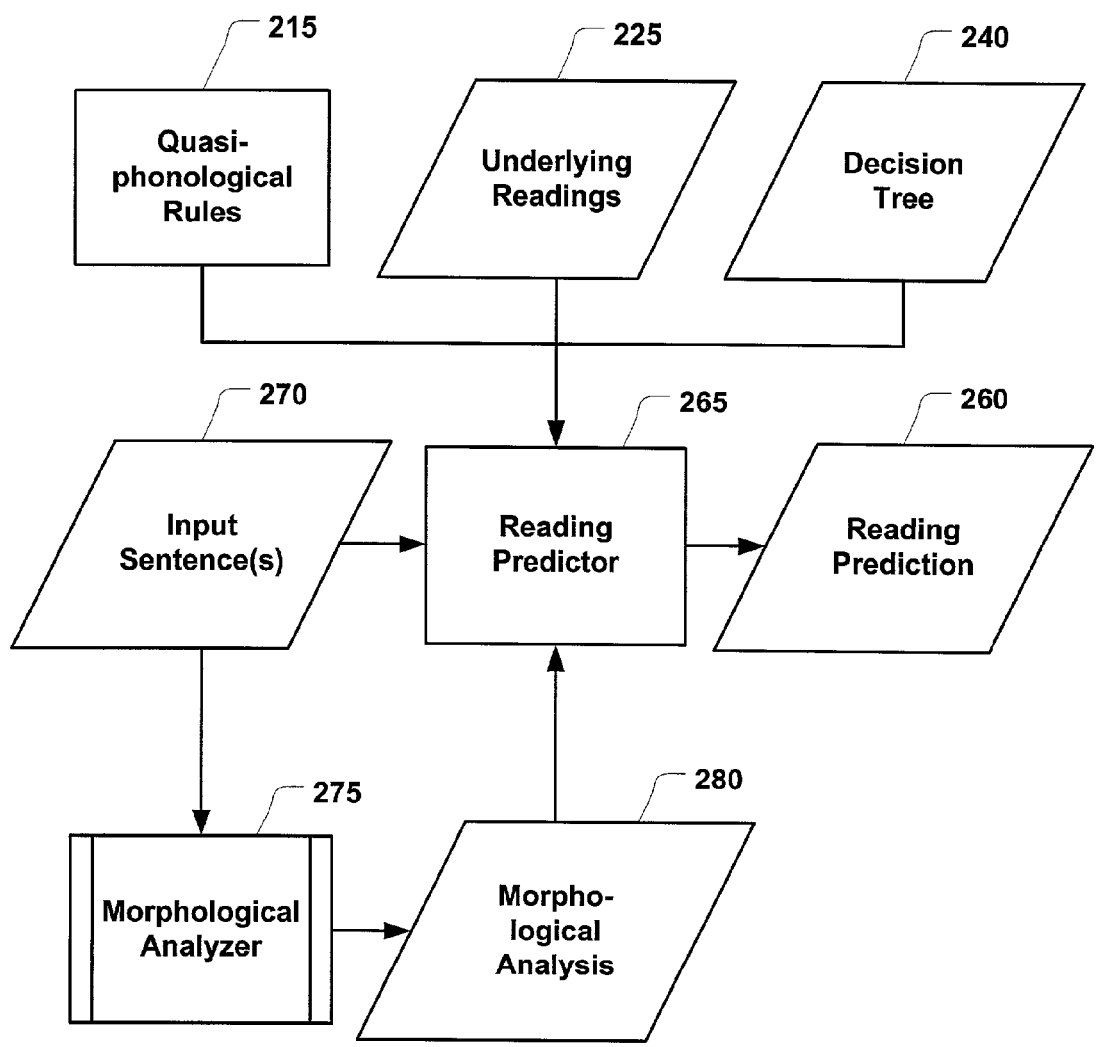
FIG. 2A is a block diagram of components cooperating to realize the execution of the prediction of readings of Japanese script in accordance with the present invention.

FIGS. 2 and 2A show the cooperation of various data and processing components of reading prediction system 200 to generate underlying readings and a decision tree for use when predicting readings of Japanese ideographs. In an illustrative implementation, reading prediction system 200 comprises base kanji readings 205, training corpus 210, quasi-phonological rules 215, reading analyzer 220, underlying readings 225, analyzed corpus 230, corpus classifier 235, decision tree 240, input sentences 270, reading predictor 265, morphological analyzer 275, morphological analysis 280, and reading predictions 260. Reading predictions system 200 operates in two phases, a "learning phase" and an "execution/run-time phase." FIG. 2 shows the cooperation of illustrative components for the "learning phase" of reading predictions system 200. The "learning phase" provides reading prediction system 200 with decision tree 240 and underlying readings 225 that are used (along with other illustrative components as shown in FIG. 2A) during the "execution/run-time" phase to provide reading predictions.

As shown in FIG. 2, reading analyzer 220 accepts as input base kanji readings 205, training corpus 210, and quasi-phonological rules 215. Using these data, reading analyzer 220 creates analyzed corpus 230 and underlying readings 225. Analyzed corpus 230 acts as input to corpus classifier 235 that in turn generates decision tree 240. Further, as shown processing is passed from reading analyzer 220 to corpus classifier 235 once underlying readings 225 and analyzed corpus 230 are generated. Using decision tree 240 and underlying readings 225, reading predictions system 200 can provide reading predictions 260 during the "execution/run-time phase." As shown in FIG. 2A, reading predictor 265 accepts as input sentences 270, decision tree 240, underlying readings 225, quasi-phonological rules 215, morphological analysis 280 to produce reading predictions 260. In operation, input sentences are operated on by reading predictor 265 and morphological analyzer 275. Morphological analyzer 275 operates on input sentences 270 to produce morphological analysis 280. Morphological analyzer 275 is better described in U.S. Pat. Nos. 5,963,893 and 5,946,648, assigned to Microsoft Corp., the assignee of the present invention, both of which are herein incorporated by reference in their entirety. In turn, morphological analysis 280 acts as input to reading predictor 265 that is used to process input sentences 270 by reading predictor 265.

Specifically, reading prediction system 200 starts with a complete list of the base readings of each kanji. The base readings contain only information about pronunciation and the historical class of the reading. Readings are divided into two classes based on whether the reading was originally borrowed from Chinese (an on reading) or was created expressly for Japanese (a kun reading). This information was originally taken from a machine-readable dictionary of Japanese that Microsoft has purchased; the list was subsequently modified as necessary to improve the performance of the prediction procedure. The base readings are stored in a text file, which is read by the training program.

In the illustrative example that follows, the readings of kanji and words/morphemes are represented in romaji for the convenience of the reader. However, in the actual data, the readings are always written in hiragana. Accordingly, the examples will thus refer to "the first kana of the reading" and so forth. For example, the base reading character data for 発 are as follows:

hatsu, on reading
hotsu, on reading
abaki, kun reading
okoshi, kun reading
tachi, kun reading
hasshi, kun reading
hana, kun reading
hira, kun reading Also present at the beginning is the complete list of quasi-phonological rules. The rules specify that readings undergo certain modifications when they occur in specific environments. These rules encapsulate both purely phonological phenomena such as weak vowel deletion and Lyman's Law as well as purely orthographical phenomena such as the practice of spelling part of the reading in kana (okurigana). Each rule is implemented as an environment to be matched (the "left hand side" of the rule) and an action to be taken (the "right hand side"). A portion of the rules can be paraphrased as follows:

If a kana is part of a kun reading and it is the first kana in a morpheme, and it follows a syllabic nasal kana, and it begins with an unvoiced consonant, and the remainder of the morpheme does not contain a voiced obstruent, then replace the unvoiced consonant with its voiced counterpart.

If a reading ends with the underlying? phoneme, delete the phoneme and double the initial consonant of the reading that follows.

If a reading has more than two kana, remove the last two kana.

The rules always apply in a fixed order and cannot apply to their own output. Furthermore some rules, when applied, forbid the application of any further rules.

A corpus of training data is assembled which includes all the words in the main lexicon of the Japanese morphological analyzer, all of the morphemes in the finite state grammar of the analyzer, a list of known non-standard spelling variants, and a list of typical numbers and dates. Each entry includes the item's spelling, its morphological category or part of speech, and the item's reading. The corpus is processed into several text files which are processed by reading analyzer 220 of FIG. 2.

A portion of exemplary data contained in the corpus is as follows:

GOku, aba,発
GOsu, oko,発
GOsu, ha?,発
GOtu, ta,発
Geo, hassamu,発寒
Lnme, hossa,発地
Noun, kappatsu,活発
Noun, hatsumei,発明
Noun, ichinenhokki,一念発起
Noun, kanpatsu,間発
Noun, kanpatsu,渙発
Noun, hokku,発句
Noun, hotsui,発意
DER_class_shot_hatu, ippatsu,一発
DER_class_shot_hatu, nihatsu,二発
DER_class_shot_hatu, sanpatsu,三発

During the "learning phase" each entry of the training corpus is analyzed to determine for each kanji in each word which base reading is used, which phonological rules applied, and which rules could have applied but did not. This step is realized by performing an exhaustive search of possible combinations, and finding those that produce a reading that matches the entry's reading. Illustrative processing is as follows:

For each entry in the training corpus
  For each kanji in the spelling
    For each of the kanji's base readings
      Substitute the base reading for the kanji to form a reading hypothesis
    For each reading hypothesis
      For each phonological rule with an environment that is matched
        Duplicate the current reading hypothesis
        In one copy, perform the action part of the rule and mark that the rule was applied.
        In the other copy, mark that the rule was blocked.
      If a reading hypothesis matches the reading of the entry, save the hypothesis It is possible for reading analyzer 220 to produce more than one successful hypothesis, or to produce none at all. In the case of multiple successful hypotheses, the reading prediction system chooses the best hypothesis using heuristics that favor simpler hypotheses. By examining the output of the "learning phase," the set of base readings and phonological rules can be modified to reduce the number of ambiguities and failures.

As an example of typical operation, during the "learning phase" the following entry may be analyzed as follows:

Noun, kanpatsu,渙発

The character 渙 has just one base reading:
kan, on

Combined with the eight base readings for 発 enumerated above, this produces eight reading hypotheses before phonological rules are applied: kanhatsu, kanhotsu, kanabaki, kanokoshi, kantachi, kanhasshi, kanhana, and kanhira. Reading analyzer 220 (the algorithm executed by reading analyzer) finds that kanhatsu matches the environment for a rule called NasalVoicing, which voices consonants after a syllabic nasal. Applying this rule would produce kanbatsu, and no subsequent combination of rule applications leads to the correct reading. However, if NasalVoicing is blocked then the hypothesis matches the environment for another rule, NasalStopping. Applying this rule produces kanpatsu. A later rule, SpellingVariant1, would change kanpatsu to kanpa; when this rule is blocked, the final hypothesis remains kanpatsu, which is the correct surface reading.

The reading hypotheses are converted into underlying readings by a straightforward method. It is assumed that every phonological rule will apply when its environment is matched, unless it is blocked. The underlying reading thus needs only to record which rules are blocked. For the above example, the underlying readings are thus:

換—kan, on, -NasalVoicing

発—hatsu, on, -SpellingVariant1

After analyzing the entire training corpus in this fashion, reading predictions system 200 has identified the complete set of underlying readings 225 for each kanji, and the complete set of words where each reading has appeared. Reading predictions system 200 uses this information to create decision tree 240 for each kanji; decision tree 240 predicts the underlying reading of the kanji in a given context. Decision tree 240 uses only information that will be available from the morphological analysis of a sentence. Stated differently, decision tree 240 can make a prediction about the underlying readings of words regardless of whether the words occurred in the training corpus.

In an illustrative implementation, decision tree 240 is created using a variant of the well-known ID3 machine learning algorithm. That is, each word is treated as an event, the outcome of which (the correct underlying reading) is known. The algorithm attempts to classify the events into subsets which all have the same outcome. It does so by dividing the set of events into subsets where each member of the subset has the same value of a classification attribute, where the attribute is something known about the event other than the outcome. By calculating the entropy of each set before and after being divided, the algorithm is provided with a metric called entropy gain. The algorithm searches for the sequence of attribute tests that maximizes the entropy gain at each division, and creates a sequence of tests that eventually classifies the events into homogeneous subsets sharing the same outcome.

During the "learning phase" reading predictions system 200 employs classification attributes which is the information available from morphological analysis. The set includes attributes such as:

IsBoundMorpheme—true if the morpheme containing kanji is an affix

IsStemMorpheme—true if the morpheme containing the kanji is a stem

IsMorphInitial—true if the kanji is the first character in the morpheme

IsMorphFinal—true if the kanji is the last character in the morpheme

PrecedesKanji—true if the kanji immediately precedes another kanji in the morpheme Follows Kanji—true if the kanji immediately follows another kanji in the morpheme Precedes Hiragana—true if the kanji immediately precedes a hiragana in the morpheme FollowsHiragana—true if the kanji immediately follows a hiragana in the morpheme PrecedesKatakana—true if the kanji immediately precedes a katakana in the morpheme Follows Katakana—true if the kanji immediately follows a katakana in the morpheme AllKanji—true if all the characters in the morpheme containing the kanji are kanji IsUnigram—true if the morpheme containing the kanji is only one character long IsBigram—true if the morpheme containing the kanji is two characters long IsTrigram—true if the morpheme containing the kanji is three characters long IsTetragram—true if the morpheme containing the kanji is four characters long IsFactoid—true if the morpheme containing the kanji is a name, date, or number IsBoundR—true if the morpheme containing the kanji is a one character suffix IsBoundL—true if the morpheme containing the kanji is a one character prefix MorphIDEquals(X)—true if the morpheme containing the kanji is X WordIDEquals(X)—true if the word containing the kanji is X NextCharEquals(X)—true if the kanji immediately precedes X in the morpheme ThirdCharEquals(X)—true if the kanji precedes X by two characters in the morpheme PrevCharEquals(X)—true if the kanji immediately follows X in the morpheme Using the classification attributes reading predictions system 200 would operate on the following examples as follows. For example, suppose that the only instances of 発 in the training corpus were:

1. GOku, aba,発
2. GOsu, oko,発
3. Noun, kappatsu,活発
4. NCna, hatsumei,発明
5. Noun, ichinenhokki,一念発起
6. Noun, kanpatsu,換発
7. Noun, hokku,発句
8. Noun, hotsui,発意

The underlying readings of 発 identified by the analysis phase would be:

1. A: aba, kun, -SpellingVariant1
2. B: oko, kun, -SpellingVariant1
3. C: hatsu, on, -SpellingVariant1
4. C: hatsu, on, -SpellingVariant1
5. D: hotsu, on
6. C: hatsu, on, -SpellingVariant1
7. D: hotsu, on
8. E: hotsu, on, -SpellingVariant1

The reading analyzer algorithm would create a decision tree like:

```
If_IsMorphID(GOku)
    Reading A
Else
    If_IsMorphID(GOsu)
        Reading B
    Else
        If_IsFinal
            Reading C
        Else
```

```
        -continued
       If_IsTetragram
            Reading D
       Else
            If_IsMorphID(Ncna)
                 Reading C
            Else
                 If_NextCharEquals(句)
                      Reading D
                 Else
                      Reading E
```

In some cases the classification attributes cannot completely separate the words into homogenous classes. When this situation arises, the algorithm performs the final separation probabilistically, based on the frequencies of the examples, which is calculated from the frequencies of the words in the training corpus. If the example data above also included the item:

9. Noun, hatsui, 発意(reading C)

and both items 8 and 9 had the same frequency, the final piece of the above tree would be replaced by:

```
       If_NextCharEquals(句)
            Reading D
       Else
            Probabilistic
                 .5 Reading E
                 .5 Reading C
```

Figure 5:
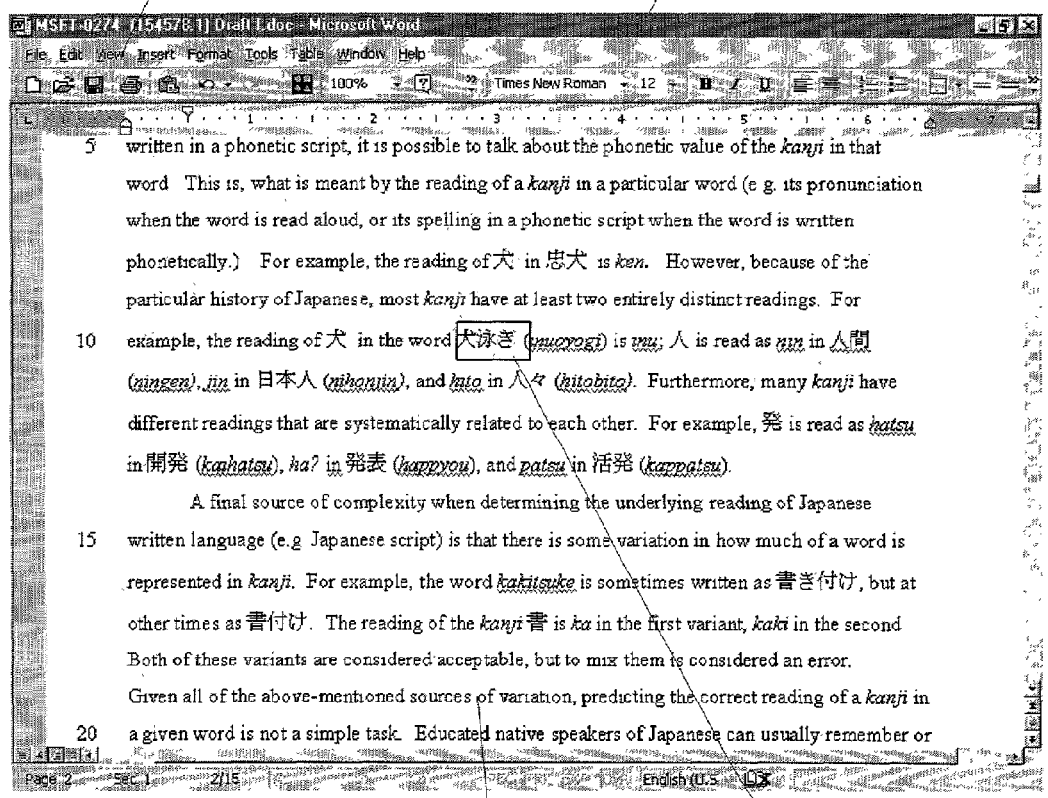
FIG. 5 is a screen shot of an exemplary computing application having Japanese reading features in accordance with the present invention.

In order to maximize speed in the "execution/run-time" phase, most of the work is done during the "learning" phase. During the "execution/run-time" phase, the reading prediction algorithm is implemented as a module within an exemplary computing application (as shown in FIG. 5), which also contains the Japanese morphology analyzer. To predict the reading for a given kanji, the morphology engine is used to analyze the sentence that contains the word that contains the kanji. The values of the classification attributes are calculated from the analysis and then used to walk through the decision tree to find the underlying reading for the kanji.

Then the phonological rules are applied to the underlying readings, (unless they are blocked by the underlying reading) to produce the surface form of the reading. A confidence level is also calculated for the surface reading; if the traversal of the decision tree encountered a probabilistic node, the confidence level will reflect the probability of the paths followed. If the reading prediction module is called repeatedly for the same input words, it will return all the different possible predictions in order of decreasing confidence.

Figure 3:
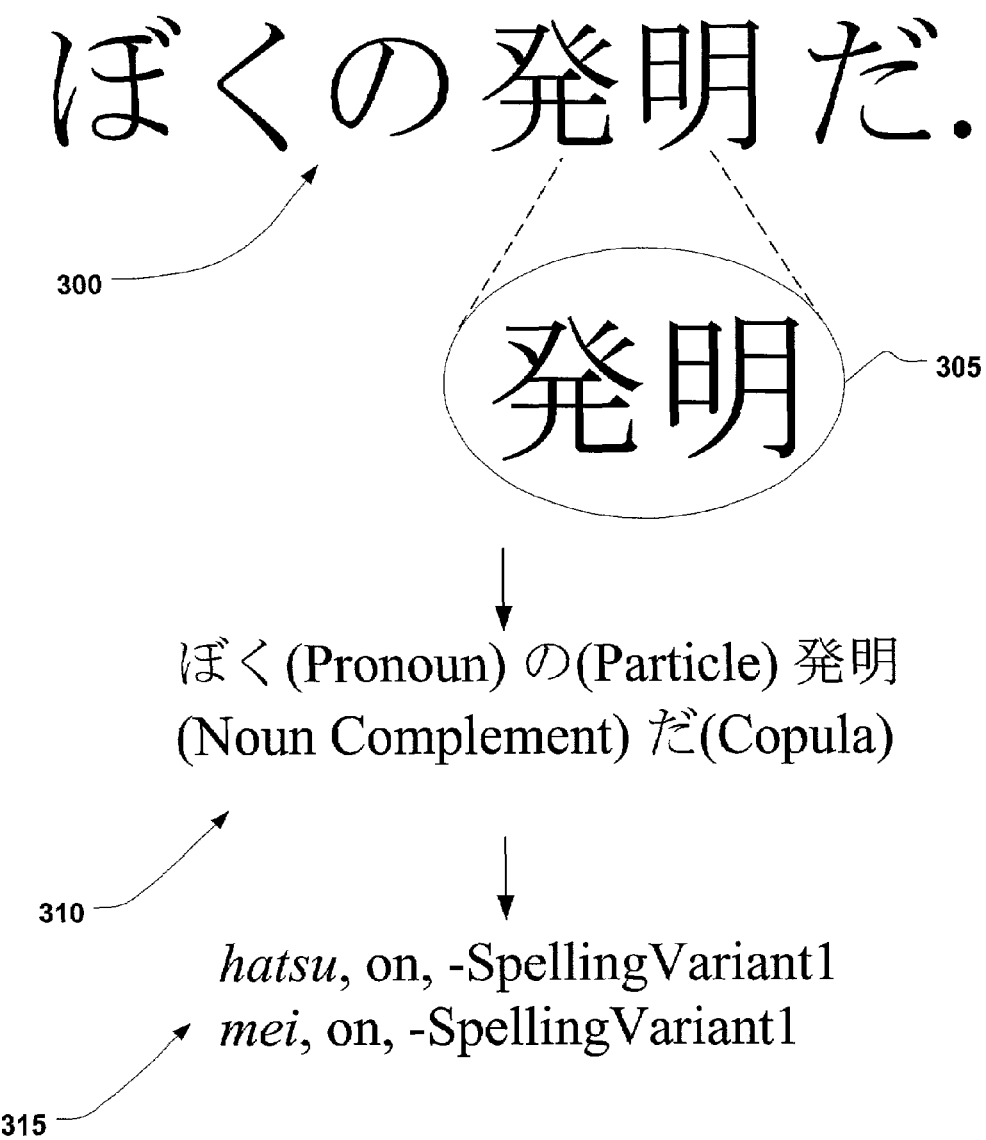
FIG. 3 is a block diagram of exemplary processing for Japanese script in accordance with the present invention.

FIG. 3 shows the general steps that are performed by reading predictions system 200 to analyze and provide reading predictions for an exemplary sentence. As shown, to determine the reading of the word of the word 発明(305) in the sentence:

ぼくの発明だ. (300)

The sentence is first analyzed by morphological analyzer 275 of FIG. 2A, revealing the structure:

ぼく(Pronoun)　の(Particle)　発明(Noun Complement)
発明(Copula).(310)

Then the classification attributes for the two kanji 発and だare calculated. The decision trees for each of the two kanji are then walked through, according to the values of the attributes. The underlying readings (315):

hatsu, on, -SpellingVariant1
mei, on, -SpellingVariant1 are selected, and a representation of the word reading hatsumei is created. Then the phonological rules are applied to the word reading, and since the only rule with an environment that matches is SpellingVariant1, and that rule is blocked from applying to both readings, the final surface reading prediction is hatsumei.

Figure 4:
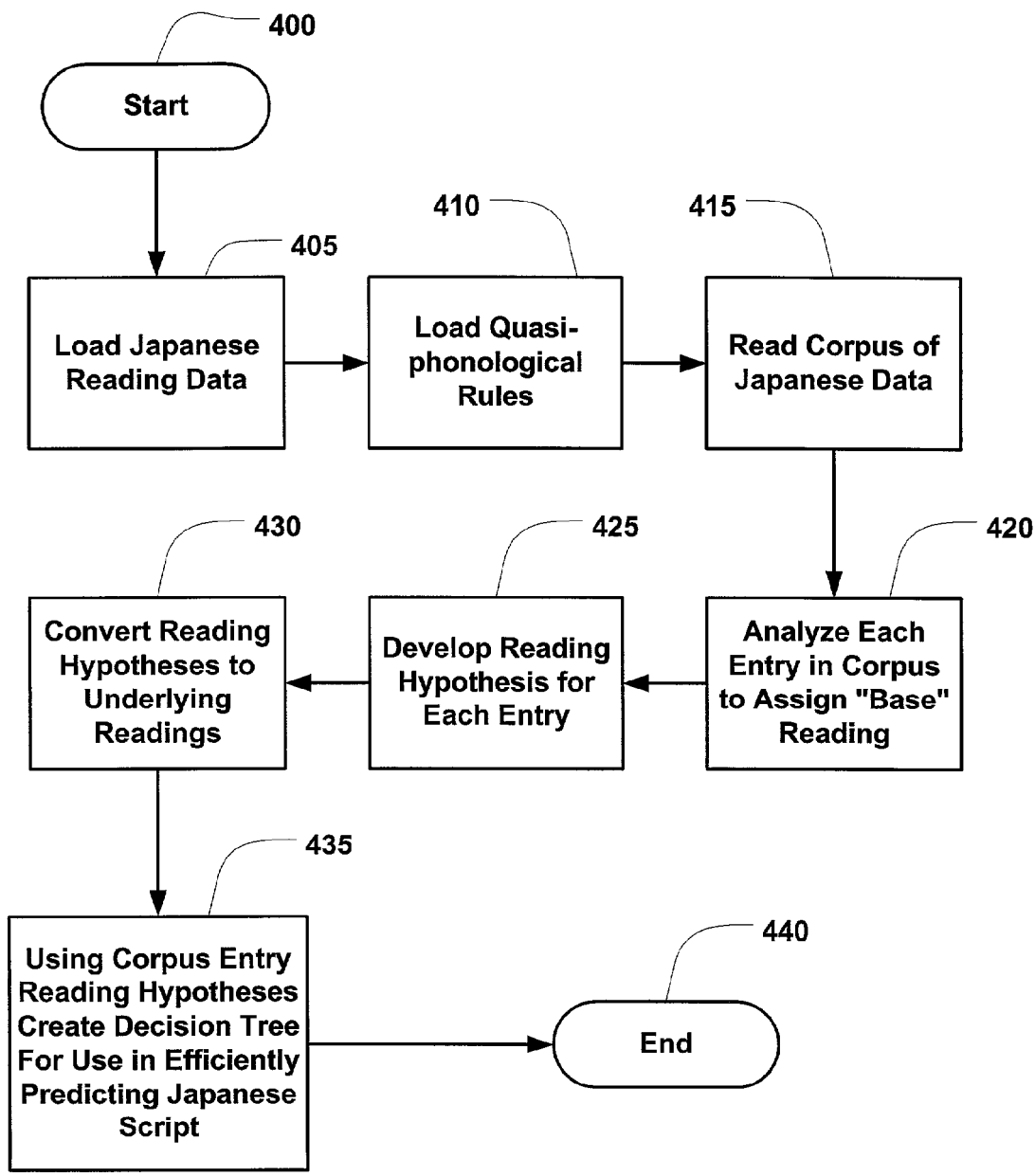
FIG. 4 is a flow diagram of the processing performed to develop a decision tree for use when predicting the reading of Japanese script in accordance with the present invention.

FIG. 4 shows in more detail the processing performed by reading predictions system 200 when operating in the "learning phase". Processing begins at block 400 and proceeds to block 405 where Japanese reading data is loaded onto reading predictions system 200. In an illustrative implementation, Japanese reading data comprises a set of standard kanji readings, including their classification as on or kun readings. From there quasi-phonological rules are loaded onto reading predictions system 200 at block 410. Then the corpus of Japanese data 415 is loaded onto reading predictions system 200. The corpus of Japanese data is comprised of entries from a Japanese dictionary, morphemes from a Japanese finite-state grammar, and a set of Japanese phrases such as numbers and dates. Each item includes a spelling, a reading, and a part of speech or morphological category. A base reading is then assigned to each entry of the Japanese data corpus at block 420. Processing then proceeds to block 425 where a reading hypothesis is developed for each entry of the Japanese data corpus. The developed hypotheses of block 425 are then converted to underlying readings at block 430. Using the underlying readings, reading predictions system 200 creates a decision tree that is used in the "execution/run-time phase" of reading predictions system 200. The decision tree having been generated, processing terminates at block 440.

Figure 4A:
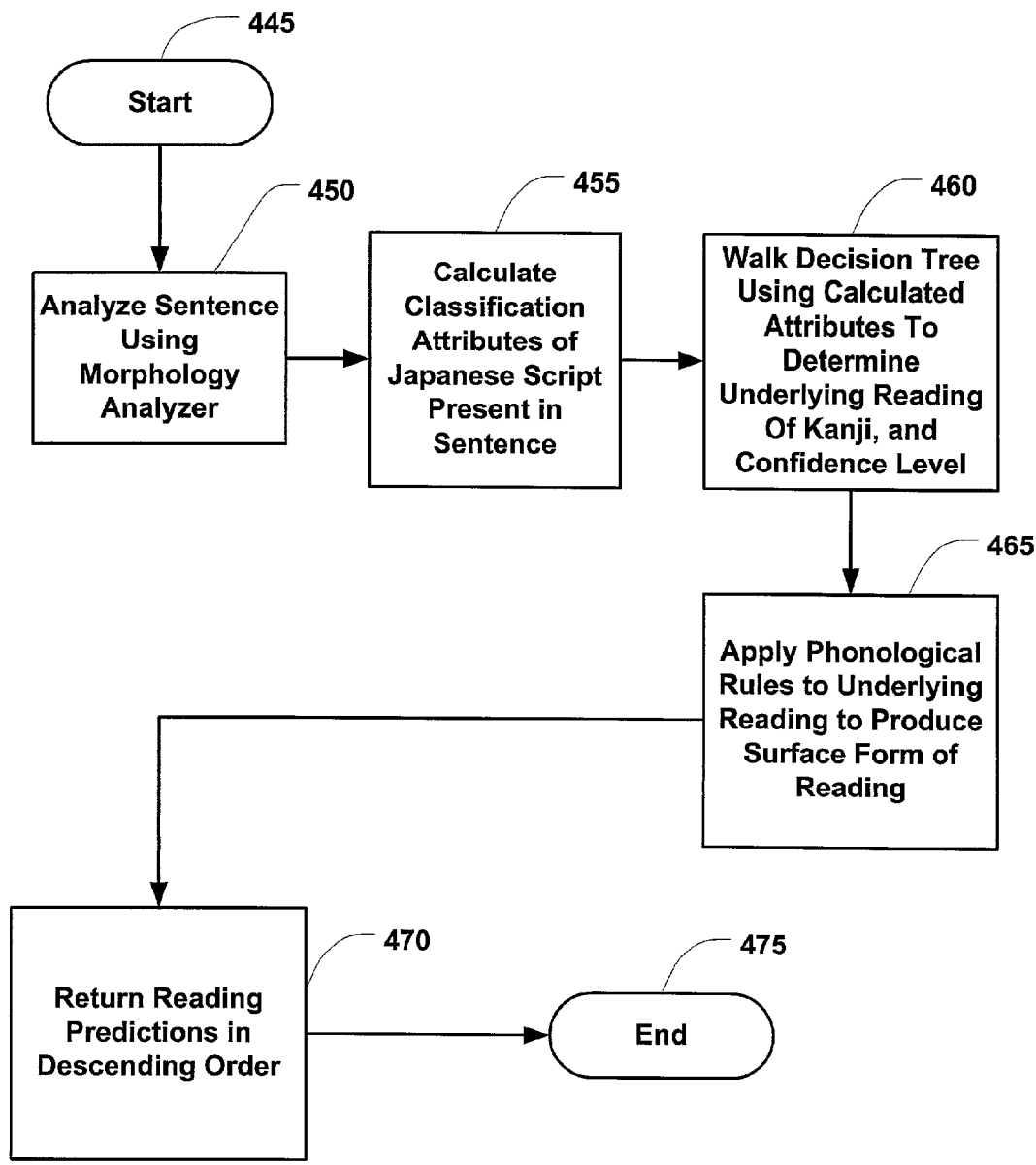
FIG. 4A is a flow diagram of the processing performed when predicting the reading of Japanese script in accordance with the present invention.

FIG. 4A shows the processing performed by reading prediction system when operating in the "execution/run-time" mode/phase. As shown, processing begins at block 445 and proceeds to block 450 where an inputted sentence is analyzed using a morphology analyzer. From there processing proceeds to block 455 where the classification attributes of the Japanese ideographs present in the inputted sentence are calculated. Using the classification attributes, the decision tree (generated in block 435 of FIG. 4) is "walked" to determine underlying reading of Japanese ideographs (kanji), as well as a confidence level for the prediction. A surface form reading is then produced at block 465 by applying phonological rules to the created underlying reading. The surface forms are returned in order of decreasing confidence at block 470. Processing then terminates at block 475.

FIG. 5 shows a screen shot of an exemplary computing application having incorporated therein features of the present invention. Exemplary computing application 500 comprises display/interface pane having display/interface controls 510 and display/interface area 515. As shown, Japanese ideographs (i.e. kanji script) 520 can be displayed in display/interface area 520. In operation, exemplary computing application 500 may employ features of the present invention to perform a style check on inputted Japanese ideographs (e.g. 520) to ensure proper usage of the inputted Japanese ideographs in proffered Japanese sentences. Such operation may be realized through the use of a "Style Checker" feature in exemplary computing application. The "Style Checker" may be incorporated as one of display/interface controls 510 such that when Japanese sentences (i.e. Japanese sentences having words comprised of Japanese ideographs) are inputted for display on display/interface area 515, the "Style Checker" having incorporated reading predictions system (of FIGS. 2 and 2A), can process the inputted Japanese sentences and confirm consistent usage of inputted Japanese ideographs.

In sum, the present invention provides a system and methods allowing for effective and reliable reading predictions for Japanese ideographs. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner. Further, the storage elements of the exemplary computing applications may be relational or sequential (flat file) type computing databases that are capable of storing data in various combinations and configurations.

Although exemplary embodiments of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. A computer-based method to predict the reading of Japanese ideographs of at least one of Japanese words and sentences in a data store comprising the steps of:
    creating at least one pronunciation representation for at least one of the Japanese ideographs in the data store, wherein the pronunciation representation is created by employing data comprising base kanji readings and quasi-phonological rules, said base kanji readings comprising pronunciation and historical class information;
    providing a reading analyzer, said reading analyzer accepting as input at least one of the group consisting of: said base kanji readings, said quasi-phonological rules, and a training corpus; said reading analyzer further generating a decision tree, said decision tree setting forth steps for selecting one of said at least one pronunciation representation using morphological information from said at least one of Japanese words and sentences; and
    processing said at least one of Japanese words and sentences to provide readings of said Japanese ideographs of said at least one of Japanese words and sentences.

2. The method as recited in claim 1, wherein said generating a decision tree further comprises providing a learning algorithm, said learning algorithm setting forth steps to creating said decision tree.

3. The method as recited in claim 2, wherein said providing a learning algorithm comprises furnishing an ID3-type machine learning algorithm.

4. The method as recited in claim 3, further comprising the steps of:
    treating each Japanese ideograph in each Japanese word of said data store as an event, wherein the outcome of each event is a correct pronunciation representation of said each Japanese ideograph in each Japanese word;
    classifying said events into sets having the same outcome, wherein said classifying further comprises dividing said sets into subsets where each member of said subsets has the same value of a classification attribute;
    calculating the entropy of each set before and after being divided to produce an entropy gain; and
    searching for a sequence of attribute tests that maximizes the entropy gain at each division to create a sequence of tests that classifies the events into homogenous subsets sharing the same outcome.

5. The method as recited in claim 1, wherein said processing said at least one of Japanese words and sentences further comprises:
    accepting as input at least one of the group consisting of: said decision tree, said at least one pronunciation representation, said quasi-phonological rules, and a morphological analysis, further comprising using said input to parse said at least one of Japanese words and sentences to identify Japanese ideographs and their respective readings,
    wherein said morphological analysis is produced by a morphological analyzer using linguistic morphology rules.

6. The method as recited in claim 5, further comprising:
    analyzing said at least one of Japanese words and sentences by said morphological analyzer to determine their structure, wherein said structure comprises Japanese ideographs;
    calculating classification attributes for said Japanese ideographs; walking said decision tree according to the value of said calculated attributes;
    selecting the appropriate pronunciation representation for said Japanese ideographs; and applying said quasi-phonological rules to said at least one pronunciation representation to produce surface readings.

7. A computer readable storage medium comprising computer-executable instructions for instructing a computer to perform the acts recited in claim 1.

8. A system to predict pronunciation representations of Japanese ideographs comprising:
    a processor;

computer-executable instructions executable on said processor that perform the function of a Japanese reading analyzer, said Japanese reading analyzer configured to accept a corpus of Japanese word data as input to produce pronunciation representations for Japanese ideographs in said corpus of Japanese word data;

wherein said Japanese word data comprises at least one of the group consisting of: basic kanji readings, a training corpus, and quasi-phonological rules; and configured to generate a decision tree used in predicting a reading of Japanese ideographs using morphological information from at least one of Japanese words and sentences; and computer-executable instructions executable on said processor that perform the function of a Japanese reading predictor, said Japanese reading predictor configured to accept said decision tree, said Japanese word data, and a morphological analysis as input to operate on said at least one of Japanese words and sentences to provide pronunciation representation predictions for Japanese ideographs present in said at least one of Japanese words and sentences, said pronunciation representation predictions created by employing data comprising base kanji readings and quasi-phonological rules, said base kanji readings comprising pronunciation and historical class information.

9. The system as recited in claim 8, wherein said morphological analysis is created by a morphological analyzer, said morphological analyzer configured to process said at least one of Japanese words and sentences according to pre-defined Japanese language morphology rules.

10. The system as recited in claim 9, wherein said morphological analyzer is configured to accept as input said at least one of Japanese words and sentences to calculate classification attributes for Japanese ideographs present in said at least one of Japanese words and sentences, wherein said classification attributes assist said Japanese reading predictor to create a surface reading for said Japanese ideographs present in said said at least one of Japanese words and sentences.

11. The system as recited in claim 10, wherein said classification attributes comprises at least one of the group consisting of: IsBoundMorpheme, IsStemMorpheme, IsMorphInitial, IsMorphFinal, PrecedesKanji, FollowsKanji, PrecedesHiragana, FollowsHiragana, PrecedesKatakana, FollowsKatakana, AllKanji, IsUnigram, IsBigram, IsTrigram, IsTetragram, IsFactoid, IsBoundR, IsBoundL, MorphIDEquals(X), WordIDEquals(X), NextCharEquals(X), ThirdCharEquals(X), and PrevCharEquals(X).

12. The system as recited in claim 11, wherein said classification attributes are rooted in Japanese linguistic rules.

13. The system as recited in 8, wherein said Japanese reading analyzer comprises a learning algorithm, said learning algorithm providing steps to facilitate creation of said decision tree.

14. The system as recited in claim 13, wherein said learning algorithm is an ID3-type machine learning algorithm.

15. The system as recited in claim 8, wherein said system is incorporated as part of a computing application, said computing application providing features that allow for the reading of Japanese ideographs for style checking.

16. A computer-based method to allow for reading predictions of Japanese ideographs in an electronic format performing the acts of:

providing a reading analyzer, said reading analyzer accepting as input Japanese language data comprising at least one of the group consisting of base kanji readings, a training corpus, and quasi-morphological rules;

operating said reading analyzer in a learning mode, wherein said reading analyzer operates on said Japanese language data to produce pronunciation representations for said Japanese language data and to generate a decision tree for use when predicting pronunciation representations of said Japanese ideographs using morphological information from at least one of Japanese words and sentences, said pronunciation representations created by employing data comprising base kanji readings and quasi-phonological rules, said base kanji readings comprising pronunciation and historical class information;

providing a reading predictor, said reading predictor employing said pronunciation representations and said decision tree to determine characteristics for said Japanese ideographs, wherein said characteristics contribute to the reading predictions of said Japanese ideographs.

17. The method as recited in claim 16, wherein said providing said reading predictor further comprises furnishing a morphological analysis for said at least one of Japanese words and sentences, said morphological analysis generated by a morphological analyzer operating on said at least one of Japanese words and sentences using Japanese linguistic morphology rules.

18. A computer readable storage medium comprising computer-executable instructions for instructing a computer to perform the acts recited in claim 16.

* * * * *

UNITED STATES PATENT AND TRADEMARK OFFICE
CERTIFICATE OF CORRECTION

PATENT NO. : 7,328,404 B2 Page 1 of 1
APPLICATION NO. : 09/859341
DATED : February 5, 2008
INVENTOR(S) : Richard Lee Critchlow It is certified that error appears in the above-identified patent and that said Letters Patent is hereby corrected as shown below:

In column 17, line 38, in Claim 10, after "said" delete "said".

Signed and Sealed this
Fifteenth Day of February, 2011

David J. Kappos
*Director of the United States Patent and Trademark Office*